Feb. 2, 1954  J. MARCROFT  2,668,017
WIRE GUIDE
Filed June 29, 1951
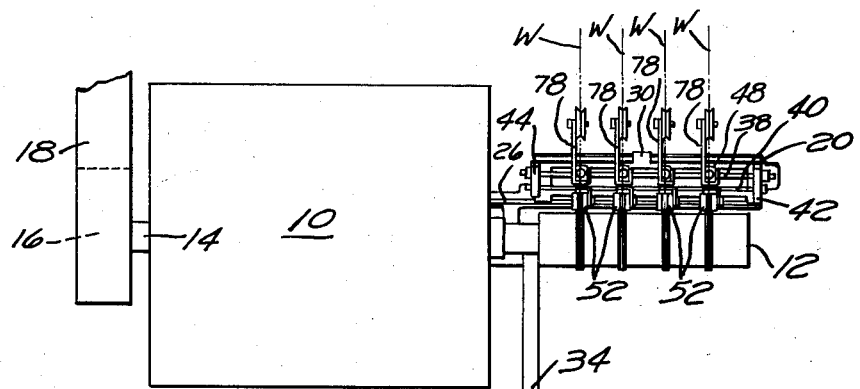
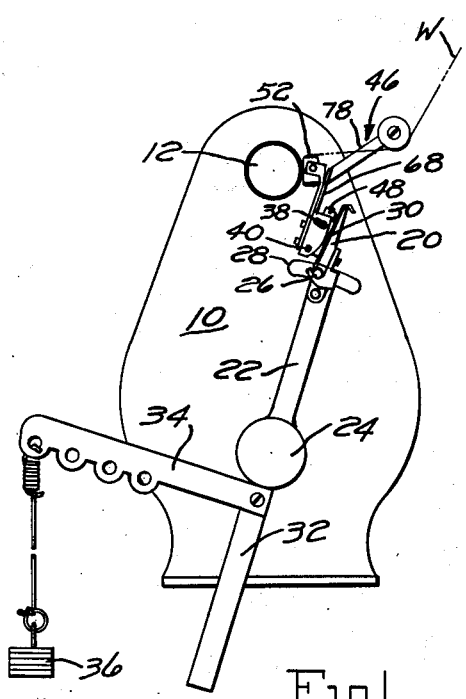
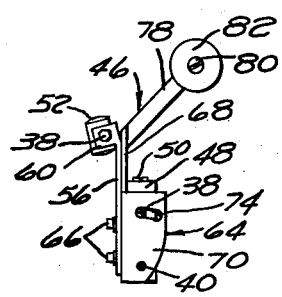
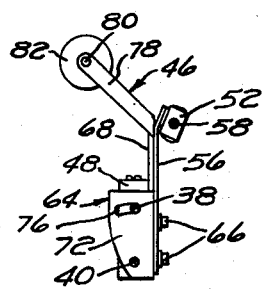
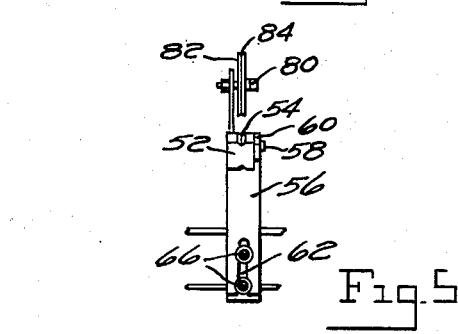
INVENTOR.
JESSE MARCROFT
BY
ATTORNEY Patented Feb. 2, 1954

2,668,017

UNITED STATES PATENT OFFICE 2,668,017

WIRE GUIDE

Jesse Marcroft, Rehoboth, Mass., assignor to Universal Winding Co., Cranston, R. I., a corporation of Massachusetts Application June 29, 1951, Serial No. 234,193

3 Claims. (Cl. 242—9)

The present invention pertains to a wire guide for use with a coil winding machine and more particularly pertains to a wire guide adapted to be used in conjunction with one or more similar wire guides to wind a plurality of coils on the same spindle or arbor.

In many electrical applications it is desirable to use a self-supporting coil of wire which is self-supporting by reason of being wound with a "cross wind" or "universal" type of wind. It is customary to wind a plurality of such coils simultaneously on a single spindle or arbor and employing a single traverse mechanism having a wire guide for each coil being wound to lay the wire on its respective coil. It is essential to the formation of a satisfactory universal or cross wound coil that the wire guide be in contact with the surface of the coil as it is being wound so that the wire is laid in position on said coil. In one form of coil winding machine employed to wind universal or cross wound coils a traverse frame or back, which carries the wire guides, is pivotally mounted to be moved away from the winding arbor by the coils being wound as they increase in diameter. If the diameter of one strand of wire being wound happens to be slightly larger, due to manufacturing inaccuracies, than the diameter of the other strands of wire, the coil being wound from the larger diameter wire increases in diameter faster than does the other coils. This results in the single larger diameter coil moving the traverse frame back as it grows causing the traverse frame to move all of the wire guides away from the arbor at the same rate with the result that the wire guides forming coils from the smaller diameter wire are moved away from the surface of their respective coils to cause the wire to be laid thereon inaccurately and to thereby give defective coils.

It is accordingly one object of the present invention to provide a wire guide adapted to be used in connection with other similar wire guides to wind the plurality of self-supporting coils on a single spindle or arbor and being adapted to compensate for differences in the diameter of the wire being wound.

Another object of the present invention is to provide a wire guide adapted to be used in connection with one or more similar wire guides to wind a plurality of self-supporting coils on a single spindle or arbor and being capable of limited pivotal movement towards and away from the coil being wound independently of its traversing mechanism.

Another object of the present invention is to provide a wire guide adapted to be used in connection with one or more similar wire guides to wind a plurality of self-supporting electrical coils on a single spindle or arbor said wire guides being adapted to be carried by a single wire guide traversing means and each being adapted for pivotal movement towards and away from said spindle or arbor independently of the others.

Another object of the present invention is to provide a wire guide adapted to be used in connection with one or more similar wire guides to wind a plurality of self-supporting electrical coils on a single spindle or arbor said wire guides being adapted to be carried by a single wire guide traversing means and each being adapted for pivotal movement towards and away from said spindle or arbor independently of the others, and each of the wire guides being adapted to be maintained in contact with its respective coil by the tension of the wire being wound.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

Figure 1 is an end view of a winding machine incorporating the wire guide of the present invention;

Fig. 2 is a plan view thereof;

Fig. 3 is an enlarged end view of the wire guide;

Fig. 4 is a view showing the other side of the wire guide; and

Fig. 5 is a front elevation of the wire guide.

Referring now to the drawing there is disclosed in Figures 1 and 2 a coil winding machine comprising a housing member 10, adapted to be mounted on a bed or table, not shown, having a winding spindle 12 rotatably journaled therein and projecting from one end thereof. Housing member 10 also contains a rotatable cam, not shown, adapted to reciprocate a plurality of wire guides in a manner to be explained hereinafter. Spindle 12 and the wire guide reciprocating cam are rotated in a manner well known to those skilled in the art by means of shaft 14 journaled in housing 10 and projecting from the other end thereof and pulley 16 carried thereby which is driven by belt 18 which in turn is driven from any convenient source of power.

A traverse frame 20 is carried by one end of a lever 22 which is pivoted at 24 for pivotal movement about the axis of the wire guide reciprocating cam carried by housing 10 to permit said traverse frame to swing towards and away from spindle 12. A traverse rod 26 is slidably journaled in traverse frame 20 for reciprocation thereon in a manner well known to those skilled in the art and extends from traverse frame 20 through arcuate slot 28 in the adjacent end wall of housing 10 and into engagement with the cam surface of the cam carried in said housing for reciprocation thereby. A reciprocating wire guide carrying plate 30 is mounted on traverse frame 20 for longitudinal sliding movement thereon. Plate 30 is connected at its lower edge to traverse rod 26 whereby reciprocation of said rod reciprocates said plate and the wire guides 46 of the present invention carried thereby. Lever 22 is provided with an extension 32 on the other side of pivot point 24 which adjustably carries a forwardly extending arm 34 adapted to have weights 36 attached thereto to urge lever 22 in a counterclockwise direction as viewed in Fig. 1 to bring the wire guides carried by traverse frame 20 against winding spindle 12. All of the foregoing structure is old in the art and only so much of it has been described and shown as will make possible a complete understanding of the wire guide of the present invention.

Reciprocating plate 30 carries for reciprocation therewith two parallel substantially horizontal rods 38 and 40 spaced from its face by means of having their ends fixedly attached to rod mounting blocks 42 and 44 at each end of plate 30. A plurality of substantially similar wire guides 46 are carried by rods 38 and 40 for reciprocation therewith and are mounted thereon for limited pivotal movement around an axis substantially parallel to traverse rod 26. Each wire guide comprises a guide positioning and reciprocating block 48 provided with a pair of spaced parallel holes adapted to slidably engage rods 38 and 40. A threaded hole is provided in the top of block 48 which receives set screw 50 adapted to engage rod 38 to clamp said block at any desired location along said rods. Each wire guide is provided with a wire guiding button 52 formed of a suitable wear resistant material and having a wire engaging groove 54 formed therein. Button 52 is carried by the bent-over upper end of a finger 56 by any convenient means, as for example, the bolt 58 and forwardly bent ear 60 formed on the upper end of finger 56. The lower end of finger 56 is bifurcated as at 62 and is adjustably carried by guide wheel carrying assembly 64 by means of a pair of screws 66 which pass therethrough and threadedly engage assembly 64. Guide wheel carrying assembly 64 is preferably formed from a suitably bent piece of sheet metal and comprises an upwardly extending front member 68 having a width substantially equal to the width of wire guide positioning block 48. The lower end of assembly 64 is provided with a pair of rearwardly bent parallel plates or ears 70 and 72. Plates 70 and 72 slidably engage the sides of guide positioning block 48 whereby said block holds said assembly and through it wire guiding button 52 against lateral movement relative to reciprocating wire guide carrying plate 30. Plates 70 and 72 are each provided adjacent their lower edges with aligned holes through which rod 40 extends. Plates 70 and 72 are also each provided adjacent their upper edges with aligned arcuate slots 74 and 76 respectively through which rod 38 extends. It will, therefore, be seen that assembly 64 will pivot about rod 40 to the extent permitted by arcuate slots 74 and 76 and rod 38. The upper end of front member 68 is provided with a rearwardly bent upwardly inclined finger 78. The uppermost end of upwardly inclined finger 78 rotatably carries, by means of a bolt 80 which serves as an axis, a grooved wire guiding wheel 82. Wheel 82 is so located on bolt 80 that its groove 84 is substantially in alignment with the groove 54 formed in wire guiding button 52.

A wire guide of the present invention functions in the following manner. Set screws 50 are loosened in wire guide positioning blocks 48 and said blocks are located along rods 38 and 40 to space the guides from each other a distance equal to the spacing between the coils to be wound on spindle 12 and the set screws are tightened to lock said guides at the predetermined spacings. Screws 66 are loosened and fingers 56 are moved vertically to position wire guiding buttons 52 against the periphery of a coil receiving core or cores mounted on spindle 12 and screws 66 are tightened. Strands of wire W are drawn down from an overhead supply, not shown, are passed under guiding wheels 82 and engaged in the grooves 84 formed therein. The strands are then passed over wire guiding buttons 52 and are located in the wire engaging grooves 54 formed therein and are then attached to suitable core members carried by winding spindle 12. Traverse frame 20 is then permitted to swing towards spindle 12 to permit wire guiding buttons 52 to engage the coil receiving cores. Weight 36 acting on forwardly extending arm 34 urges lever 22 and traverse frame 20 toward spindle 12 to cause guide wheel carrying assembly 64, finger 56, and wire guiding button 52 carried thereby to pivot rearwardly relative to traverse frame 20 until rod 38 engages the forward end of arcuate slot 74, the position illustrated in Figs. 3 and 4. As the winding progresses and the coils being wound increase in diameter, the growth of the coils causes their peripheries to react against the surface of wire guiding buttons 52 to force lever 22 in a counterclockwise direction, as viewed in Fig. 1, against the urging of weight 36. In the event that one or more of the wires W is of a slightly smaller diameter than the diameter of the remaining wires the coil being wound therefrom will not increase in diameter as rapidly as will the other coils with the result that the wire guiding button 52 carrying the small diameter wire will tend to move away from the periphery of its coil. When this condition arises, the tension of the strand of wire W acting through grooved wire guiding wheel 82, upwardly inclined finger 78 and upwardly extending front member 68 will rock or pivot the wire guide assembly forwardly around rod 40 to maintain the wire guiding button 52 in contact with the periphery of its coil.

The wire guide of the present invention has been illustrated in connection with one specific form of coil winding machine. However, it will be understood by those skilled in the art that the wire guide can be employed with other types of coil winding machines.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A wire guiding mechanism for use in a coil winding machine comprising in combination two parallel rods adapted to be reciprocated by said machine, a block adjustably carried by said rods, a member pivotally mounted on one of said rods and held against longitudinal movement relative thereto by said block, cooperating means between said member and the other of said rods whereby said other rod limits the pivotal movement of said member, a wire guiding button carried by said member adjacent one end thereof, a finger carried by said member and extending beyond said button, and a wire engaging means carried by said finger and located beyond said button adapted to be engaged by the strand of wire being wound whereby the tension of said strand tends to pivot said member around said one rod to maintain said button against the periphery of a coil being wound.

2. A wire guiding mechanism for use in a coil winding machine comprising in combination two parallel rods adapted to be reciprocated by said machine, a block adjustably carried by said rods, a member pivotally mounted on one of said rods and held against longitudinal movement relative thereto by said block, said member having a slot therein engaged by the other of said rods whereby the pivotal movement of said member is limited to a predetermined amount, a wire guiding button carried by said member adjacent one end thereof, a finger carried by said member and extending beyond said button, and a wire engaging means carried by said finger and located beyond said button adapted to be engaged by the strand of wire being wound whereby the tension of said strand tends to pivot said member around said one rod to maintain said button against the periphery of a coil being wound.

3. A wire guiding mechanism for use in a coil winding machine adapted to simultaneously wind a plurality of coils on a single arbor comprising in combination two parallel rods adapted to be reciprocated by said machine, a plurality of blocks each adjustably carried by said rods, a plurality of members pivotally mounted on one of said rods each of said members being associated with a block and being held against longitudinal movement relative to said rods by its associated block, cooperating means between each member and the other of said rods whereby said other rod limits the pivotal movement of said members, a wire guiding button carried by each of said members adjacent one end thereof, a finger carried by each of said members and extending beyond said button, and a wire engaging means carried by each of said fingers and located beyond said button, each of said wire engaging means being adapted to be engaged by the strand of wire running to its associated button whereby as one coil of a plurality being wound increases in diameter faster than the remainder of the coils being wound it will act through its associated member to move said parallel rods away from said arbor and the tension of the strands of wire being wound into the remainder of the coils being wound act upon the means carried by their associated member to pivot said members around said one rod to maintain the buttons carried thereby against the periphery of said remainder of the coils being wound.

JESSE MARCROFT.

References Cited in the file of this patent

UNITED STATES PATENTS

| Number | Name | Date |
|---|---|---|
| 589,587 | Wardell, Jr. | Sept. 7, 1897 |
| 740,958 | Wardell | Oct. 6, 1903 |
| 759,595 | Cronin | May 10, 1904 |
| 1,485,425 | Myette | Mar. 4, 1924 |
| 1,846,767 | Steuer et al. | Feb. 23, 1932 |
| 2,243,624 | Gazet | May 27, 1941 |